United States Patent [19]

Lin et al.

[11] Patent Number: 4,940,628

[45] Date of Patent: Jul. 10, 1990

[54] ERASABLE SYSTEM INCLUDING MARKING SURFACE AND ERASABLE INK COMPOSITION

[75] Inventors: Nan J. Lin, Burlington; Peter G. Hanley, Milford, both of Mass.

[73] Assignee: The Gillette Company, Boston, Mass.

[21] Appl. No.: 262,036

[22] Filed: Oct. 24, 1988

Related U.S. Application Data

[63] Continuation of Ser. No. 906,868, Sep. 15, 1986, abandoned.

[51] Int. Cl.[5] .......................... B32B 3/00; C08F 8/30; C09D 5/00

[52] U.S. Cl. .................................... 428/207; 428/195; 428/323; 428/327; 428/498; 428/519; 428/520; 434/413; 106/20; 106/23; 106/32.5; 523/161; 260/DIG. 38; 525/89; 525/98; 525/99

[58] Field of Search ............... 428/141, 195, 207, 323, 428/321.1, 321.3, 327, 519, 520, 498; 106/20, 23, 25–29, 32, 32.5; 260/DIG. 38; 523/161; 524/270, 525–526, 505; 525/89, 98, 99

[56] References Cited

U.S. PATENT DOCUMENTS

| | | | |
|---|---|---|---|
| 3,949,132 | 4/1976 | Seregely et al. | 428/207 |
| 4,297,260 | 10/1981 | Ferree, Jr. et al. | 260/29.7 H |
| 4,471,079 | 9/1984 | Enami | 525/328.5 |
| 4,686,246 | 8/1987 | Gajria | 523/401 |

FOREIGN PATENT DOCUMENTS

| | | | |
|---|---|---|---|
| 0135878 | 8/1982 | Japan | 523/161 |
| 0141256 | 8/1983 | Japan | 106/25 |

*Primary Examiner*—P. C. Ives
*Attorney, Agent, or Firm*—John P. Morley

[57] ABSTRACT

An erasable system including a marking element providing a substantially non-porous marking surface and an erasable marking composition for applying markings to the marking surface. The erasable marking composition comprises a dispersion of a particulate film-forming polymeric material and a colorant and preferably also include a water soluble polymer.

20 Claims, No Drawings

ERASABLE SYSTEM INCLUDING MARKING SURFACE AND ERASABLE INK COMPOSITION

This application is a continuation of application Ser. No. 906,868, filed Sept. 15, 1986 now abandoned.

BACKGROUND OF THE INVENTION

Part 1. The Field of the Invention

This invention relates to novel, improved erasable systems including a marking element providing a marking surface and erasable marking compositions for applying markings to such surfaces.

Part 2. Description of the Prior Art

Erasable systems including a marking element carrying or providing a marking surface and an erasable ink marking composition for applying markings to the marking surface are known to the art. Essentially, such known systems include a marking element comprising a substrate carrying an impervious or substantially non-porous marking surface and an erasable ink marking composition for applying markings to the surface which can be erased from the surface by wiping the surface with a dry eraser such as a cloth or paper tissue. The idealized combination of performance characteristics for known erasable systems has been reasonably well defined. The defined desired combination of performance characteristics for a marking element includes the capability of the marking surface to effectively receive, retain, and display applied marking composition until the received marking is erased from the surface without leaving any significant residual visable evidence of the received marking. Additionally, the desired combination of performance characteristics for marking compositions of erasable systems includes the capability of the marking composition to deposit uniform, visible markings on the surface which can dry rapidly to provide a film or coalesced residue which can be substantially completely erased from the marking surface without leaving any remaining evidence of colorants or other ingredients of the marking composition on the surface.

A known erasable system is disclosed in commonly assigned U.S. Pat. Nos. 3,834,823 and 3,949,132. The erasable system disclosed in these patents includes a marking element carrying a smooth, hard, virtually impervious marking surface such as a hard, plastic surface. The erasable marking composition of the disclosed system is included in a writing instrument having a porous point such as a felt point or a point composed of synthetic or natural fibers bound together to provide capillary channels. Essential ingredients of the erasable marking composition include a release agent having a very low vapor pressure, water, a colorant which is soluble in the water but insoluble in the release agent and a silicone surfactant which is soluble in the marking composition. Additional ingredients which may be included in the marking composition are a water-soluble wax and a water-miscible organic solvent.

In practice, the marking composition is applied to the marking surface and during evaporation of the aqueous or partially aqueous solvent, the release agent comes out of solution to form a film on the marking surface. Accordingly, on drying, the trace or line provided by the marking composition includes colorants which are insoluble in the release agent, and the colorants lie on top of the thin film of release agent. In this way, the film of release agent provides a barrier between the film and the marking surface so that the film can be erased from the surface without leaving any residual visible evidence of the marking on the surface.

U.S. Pat. No. 3,563,782 describes another known erasable system in which the marking surface is the surface of a pigmented plastic substrate, and the erasable marking composition consists of a dispersion of dye particles in a solvent having a low surface tension. The marking composition is applied to the marking surface, and after evaporation of the solvent, an erasable, non-continuous film is provided on the marking surface and the film includes discrete, closely spaced dye particles. The non-continuous film of dye particles can be erased from the marking surface by wiping the film with a cloth or soft paper.

The erasable systems described above are especially adaptable for use as substitutes for blackboards, and the marking elements usually takes the form of a relatively large panel. Moreover, the markings provided on the marking surface of the above-described erasable systems have little rub resistance so that the markings can be completely erased from the surface by a dry cloth or felt eraser to provide a clean marking surface on the marking element. Known erasable systems providing markings on a marking surface having good rub resistance require cloths or paper wet with water or solvent to effectively remove such markings and provide a clean surface for new markings. The use of wet cloths or paper obviously complicates the achievement of a clean surface for new markings.

Additionally, known erasable systems are not so easily or readily adaptable for use in office or desk paraphernalia such as daily calendars or desk notebooks designed to record appointments, schedules, accounts, or similar notations. An erasable system for use in such paraphernalia requires significantly different performance characteristics from those required for erasable systems used as substitutes for blackboards. For example, such paraphernalia is normally designed for individuals for recording desired notations useful to the individual. Accordingly, the size of the marking element needed is relatively small, and preferably, the element should be relatively flexible and have qualities and properties more closely corresponding to paper rather than to plastics. Moreover, the marking composition should be capable of reliably providing legible markings in relatively small areas of the marking surface. Also, the markings should have sufficient rub resistance so that they are not inadvertently erased such as by accidental rubbing or wiping or abrasion of the surface. The degree of rub resistance of the marking is particularly important in such paraphernalia involving a plurality of marking elements superposed on each other and where one or more of the elements has erasable markings on the marking surface. Ideally, the marking should be mechanically erasable by an elastomeric eraser rather than by a cloth or paper or the like. In this way, the marking can be effectively retained on the marking surface until it is no longer needed, and markings in selected areas can be completely and neatly erased without affecting markings in non-selected areas.

The present invention presents to the art novel, improved erasable systems having an especially desirable combination of performance characteristics which provide sufficient flexibility and latitude so that the systems are adaptable for use as a substitute for blackboards and also are especially adaptable for providing the above-described desk or office paraphernalia.

BRIEF SUMMARY OF THE INVENTION

The novel, improved erasable systems of this invention include a marking element providing a substantially non-porous surface and an erasable marking composition comprising a dispersion of a particulate film-forming polymeric material(s) and a colorant(s) and preferably also include a water soluble polymer(s). In the preferred practice of the invention, the erasable marking composition provides markings on the marking surface which are completely erasable by an elastomeric eraser.

DESCRIPTION OF THE PREFERRED EMBODIMENTS

The presently contemplated preferred erasable systems of the invention comprise a marking element providing a substantially non-porous marking surface and an erasable marking composition comprising a dispersion of a particulate, film-forming polymeric material, a water soluble polymer and a colorant. The substantially non-porous surface of marking elements of the invention has a nitrogen gas permeability of less than about 1000 cc/(mm$^2$·mm thickness), 24h as measured by ASTM procedure D1434. Preferred marking elements have a nitrogen gas permeability of less than about 250 cc/(mm$^2$·mm thickness), 24h. Suitable non-porous surfaces can be provided by ceramic, metal or glass but non-porous surfaces provided by polymeric materials are preferred. Suitable polymeric materials include polyethylenes, polypropylenes, polyvinyl chlorides, polyesters, polyethers, polyvinylacetates, polystyrenes, cellulosics such as, cellulose acetates, ethyl cellulose, cellulose acetate butyrate, cellulose propionate, cellulose triacetate and polyacrylates among others. The marking element may be a polymeric sheet material which may or may not be pigmented or otherwise colored or treated to provide a non-porous surface having a desired texture or surface reflective characteristics. Alternatively, marking elements of the invention can include substrates carrying layers or films or coatings of the above-mentioned polymeric materials or other polymeric materials capable of providing a substantially non-porous surface. Preferred marking elements comprise sheets of cellulosics, polyesters, polyethylenes, polypropylenes and polystyrenes having a thickness no greater than about 10 mils laminated to a paper substrate having a thickness no greater than about 100 mils.

Erasable marking compositions of erasable systems of the present invention comprise an aqueous or partially aqueous dispersion of a particulate, film-forming polymeric material, a water soluble polymer and a colorant. Broadly, the preferred particulate, film-forming polymeric materials useful in the practice of this invention are in the form of latexes or dispersions or suspensions of polymeric particles in water which provide a substantially water-insoluble polymeric film or polymeric residue when dry. Accordingly, useful polymeric materials include latexes of olefinic polymers including polymers and copolymers of unsaturated hydrocarbons, unsaturated hydrocarbon acids, unsaturated hydrocarbon alcohols, unsaturated hydrocarbon aldehydes and unsaturated hydrocarbon ketones. Other useful polymeric materials include copolymers of olefins and diolefins, and condensation polymers such as polyesters, polyethers, polyamines, polyamides, and polyurethanes. Preferred polymeric materials are those including the polymerized residue of such monomers as acrylonitrile, butadiene, chloroprene, isoprene, vinyl alcohol, alkyl acrylates, alkyl methacrylates, styrene, vinyl acetate, vinyl chloride, vinyldiene chloride, saturated or unsaturated diols or polyols, saturated or unsaturated dicarboxylic acids or esters, diisocyanates, and derivatives and mixtures of these monomers.

Especially preferred polymeric materials include copolymers of styrene such as styrene-butadiene, styrene-isoprene, and styrene-ethylene butylene copolymers and copolymers of acrylonitriles, especially carboxylated acrylonitriles.

The amount and type of particulate, film-forming polymeric material selected for use in marking compositions of the invention must be effective to provide a substantially water-insoluble, erasable film or coalesced residue on the marking surface when dry. Additionally, the dry film or coalesced residue should not undergo rapid cure or other changes which would impair the erasability of the film so that the film remains erasable over an extended period of time. At the same time, the erasable film must exhibit sufficient rub resistance and/or adherence to the substantially non-porous surface and sufficient integrity so that the film is not erased from the non-porous surface by inadvertent light rubbing of the film. The especially preferred marking compositions provide erasable films having a degree of erasability permitting the film to be erased in response to the action of elastomeric erasers, and the preferred films retain such a degree of erasability for a period of time up to about six months or longer. Moreover, preferred marking compositions provide erasable films which can effectively coat or encapsulate or otherwise retain the colorant(s) and other ingredients associated with the film to prevent migration of colorant and other ingredients from the film to the non-porous surface so that erasure of the film removes effectively all colorant and other ingredients associated with the film without leaving any visible residue of film on the non-porous surface. Useful amounts of preferred polymeric film-forming materials such as the copolymers of styrene and acrylonitrile mentioned before are between about 1 to about 70 percent by weight polymeric material based on the total weight of the marking composition, and most preferably, the amount of polymeric material is between about 3 to about 40 percent by weight.

Especially preferred marking compositions of the invention include a water soluble, polymeric shear-thinning providing material in combination with the film forming polymeric material. The function assigned the polymeric shear-thinning material is to control the rheological and/or thixotropic characteristics and especially the viscosity of the erasable marking compositions. Marking compositions comprising aqueous dispersions of particulate polymeric film forming materials are Newtonian fluids and have relatively low viscosities, usually less than about 200 cps. Accordingly, when applied to a non-porous marking surface, the applied composition can exhibit discontinuity and tend to "bead" and colorants can migrate from the applied composition to provide a non-uniform erasable film on drying. The added polymeric shear-thinning material increases the viscosity of the aqueous dispersion of the film forming material to provide a marking composition which is a thickened liquid at rest. However, the marking compositions undergo shear thinning when applied to a marking surface because of the high shear rates involved in marking or applying the composition to the surface. After application, the high viscosity of the composition at rest is restored and on drying, the applied composition provides an erasable film which is uniform in size and color.

Preferred water soluble polymeric shear-thinning providing materials are those which can provide marking compositions having a shear thinning index "n" between about 0.01 to about 0.60 and most preferably between about 0.05 to about 0.30. The shear-thinning index "n" is calculated by fitting shear stress (T) and shear rate (j) values (obtained from rheological measurements on a viscometer such as a Haake Rotovisco, Haake Inc., Saddle Brook, N.J.) to the empirical power law equation $T=Kj^n$ (K and n are calculated constants). Preferred specific shear thinning materials are xanthan gum, carageenan gum, locust bean gum, hydroxyethyl cellulose and guar gum. Xanthan gum is the especially preferred polymeric shear-thinning material in marking compositions of the present invention: The amount of polymeric shear-thinning material included in marking compositions of the invention is an amount sufficient to provide a marking composition having a viscosity of about 100 cps or lower when measured at 300 reciprocal seconds. Preferably the amount should be sufficient to provide a marking composition having a viscosity between about 1 cp, to about 70 cps when measured at a shear rate of 300 reciprocal seconds. Preferred amounts of xanthan gum are amounts between about 0.05 to about 2 percent by weight of the marking composition.

Colorants useful in marking compositions of erasable systems of the present invention are those which are substantially water insoluble when the erasable film of polymeric particles and colorant is dry. (Accordingly, suitable colorants include water-insoluble colorants or colorants which can be rendered water insoluble upon drying by chemical and/or physical mechanisms or colorants which can be rendered water insoluble by reason of a physical and/or chemical retention mechanism existing between the polymeric particles and colorants of the erasable film. Preferred colorants include commerically available colorants such as COLANYL BLUE A2R (American Hoechst), CRYSTAL VIOLET (BASF Wyandotte), and ECCOBRITE BLUE (Eastern Chemical) among others. Preferred amounts of the above colorants include amounts between about 0.1 to about 40 percent by weight colorant(s) based on the total weight of the marking composition and especially preferred amounts are between about 0.3 to about 15 percent by weight.

Water is the essential dispersant in marking compositions of the invention, and the amount of water in the marking compositions can vary but preferred marking compositions include from about 20 to about 95 percent by weight water based on the total weight of the composition. Oftentimes, a water-soluble or water-miscible humectant is included in the marking composition particularly if the marking composition is to be applied to the marking surface by way of a ball-point pen. The function assigned the humectant is to control dry-out of the marking composition disposed in the clearance between the socket and the rotatable point of the ball-point pen. Suitable humectants include dihydric alcohols such as ethylene, propylene, butylene diol and the like and tri- or higher-hydric alcohols such as glycerine and the like. The amount of humectant included in the marking composition can vary but normally amounts between about 1 to about 20 percent by weight of the composition are suitable. Preferred amounts of humectants are between about 5 to about 15 percent by weight of the composition.

In the practice of the invention, the marking composition is applied to the marking surface, and the water is rapidly removed from the composition by evaporation and/or absorption by the marking surface. Removal of substantially all of the water from the composition is normally complete in about thirty seconds or less. After removal of the water, the erasable coalesced residue provided on the marking surface comprises about 50 percent by weight or more of the polymeric film-forming material with the remainder being colorant and residual amounts of other encapsulated ingredients which may or may not slowly evaporate from the residue with time. Upon substantially complete drying, the erasable residue provides a substantially continuous, substantially water-insoluble film deposited on and removably bonded to the marking surface. The film essentially includes a film-forming polymeric material matrix which coats or encapsulates or otherwise retains the colorant which is uniformly dispersed throughout the matrix. The film can be completely removed from the marking surface by the action of an elastomeric eraser without abrading or otherwise damaging the marking surface carrying the film and without leaving any residual evidence of the film on the surface. Moreover, the film can be completely erased from the surface after an extended period of time such as up to about six months or longer, and new erasable markings can be applied to the portion of the surface from which the film was erased.

Other ingredients, which may be included in the marking compositions of the invention, are antioxidants, corrosion inhibitors, wetting agents and stabilizers, among others. The amount of any of the other above ingredients added to the marking composition can vary and will primarily depend upon the degree of efficacy desired from the added ingredient. However, such amounts can be readily determined by those skilled in the art. Illustrative Example 1 below describes a marking composition representative of preferred marking compositions for the erasable systems of the present invention.

EXAMPLE 1

| Ingredient | % By Weight |
|---|---|
| Polymeric Film Forming Material[1.] | 5.8 (solids) |
| Polymeric Shear-Thinning Material[2.] | 0.6 |
| Water | 90.9 |
| Colorant[3.] | 2.7 |
| Viscosity at 300 reciprocal seconds: 57.3 cps. | |

1. The polymeric film forming material was a styrene-isoprene latex having a viscosity of about 30 cps and contained about 40 percent by weight of a 65:35 isoprene to styrene co-polymer and the styrene-isoprene co-polymer had a number average molecular weight of about 100,000 or greater and a weight average molecular weight of about 120,000 or greater.
2. The polymeric shear-thinning material was a commercially available xanthan gum sold under the tradename KELZAN M by Kelco Company.
3. The colorant was a commercially available, substantially water insoluble pigment sold under the tradename COLANYL BLUE A2R by American Hoechst.

Other specific commercially available polymeric film forming materials representative of those suitable for use in marking compositions of the invention include a styrene-butadiene latex containing 70 percent by weight styrene-butadiene and sold under the tradename PLIOLITE 3757 by Goodyear Tire and Rubber Company and a carboxylated acrylonitrile-butadiene latex containing 50 percent by weight carboxylated acrylonitrile-butadiene and sold under the tradename CHEMIGUM LCG 520 by Goodyear Tire and Rubber Company. As mentioned, colorants which are water soluble but which can be rendered water insoluble are also useful in marking compositions. A representative, commercially available colorant which can be rendered water insoluble is an aqueous solution of 3 percent by weight of a cationic dye sold under the tradename CRYSTAL VIOLET by BASF Wyandette Corporation. Although the cationic dye colorant is initially water soluble, the dye is rendered substantially water insoluble by interaction with the polymeric film forming material.

EXAMPLE 2

A marking element of the invention was prepared by laminating MYLAR polyester films (0.5 mil) to both surfaces of a sheet of 60 lb. Hammermill paper using a polyvinyl acetate (GELVA TS-100) binder. Commercially available cellulosic films which can also provide suitable non-porous surfaces for markers of the present invention include FORTICEL cellulosic films and KODACELL cellulosic films sold by Celanese Plastics Company and Eastman Kodak Company respectively. Suitable commercially available polyester films include CELANAR polyester films and SCOTCHPAK polyester films sold by Celanese Plastics Company and Minnesota Mining and Manufacturing Company respectively.

The marking composition of Example 1 was applied to the marking element of Example 2 by way of a ball-point pen. The marking composition dried in twenty seconds or less and provided a marking comprising a continuous, coalesced residue or film which was easily legible and had substantially uniform color, dimensions and line quality. The film provided by the marking composition had excellent rub resistance and could not be removed or erased from the marking surface by accidental rubbing such as might occur by rubbing another marking element against the film or by lightly rubbing the film with a cloth. However, the film could be completely erased by an elastomeric eraser without leaving any residual visible evidence of the erased marking and without any damage to the surface carrying the marking. Moreover, the film of marking composition could be completely erased from the surface by an elastomeric eraser after six months.

In the broadest aspects of the invention's use, the size and shape of the marking element can vary over a wide range, and the marking composition can be applied to the surface of the marking in any suitable manner. For example, the marking composition can be applied to the surface by a brush, pen or even by the fingers if desired. For about two weeks after the marking composition has been applied to the surface, the film providing the marking can be completely removed or erased from the surface by the use of an elastomeric eraser or by energetic rubbing of the film with a dry cloth or paper or a dry brush or sponge. The intensity of the rubbing needed to remove the film by a cloth or paper or brush or sponge increases with the time the film remains on the marking surface. Within the first two or three hours after the film is applied to the surface, the intensity of rubbing needed is relatively mild, but after a few hours, the intensity of rubbing needed progressively increases. After about one week, complete removal or erasure of the film is most effectively achieved by the use of an elastomeric eraser.

In the preferred aspects of the invention, the erasable system is used to provide office paraphernalia such as daily calendars or appointment books. When used in such applications, the marking element of the system can take the form of a book including a plurality of pages of marking elements bound between covers with each page having blocks or lines and other printed indicia all arranged and integrated in a manner designed to effectively record information needed by the user. In this preferred application, the marking composition is stored in a conventional ball-point pen which includes an elastomeric eraser so that cancelled appointments or schedules can be erased and be replaced by other appointments or schedules. Preferably, means such as magnets or clips are used to retain the ball-point pen in close proximity to the calendar or appointment or schedule book.

From the above description, it should be apparent that the invention presents to the art novel, improved erasable systems having an especially desirable combination of performance characteristics. The combination of performance characteristics provides a wide latitude of applications for the erasable systems. They can be used as effective substitutes for blackboards since the marking composition provides erasable markings which can be completely removed by rubbing with a cloth or brush within a short time after the application of the marking. Alternatively, the markings can be erased by an elastomeric eraser after an extended period of time such as up to about six months or longer. The erasable systems are especially adaptable for use as office paraphernalia such as appointment books or daily calendars. In such applications, the marking composition is included in a ball-point pen, and the marking element takes the form of pages of a book. The individual user can easily write needed information on selected areas of the pages and later can easily and completely remove written information from selected areas of the page and substitute other information in the selected area without affecting information in other areas of the page. Accordingly, the novel, improved erasable systems of the present invention provide distinctive, unexpected advantages and benefits over erasable systems known to the art at the time the present invention was made.

We claim:

1. An erasable system including a marking element and an erasable marking composition for applying markings to the marking element, said marking element comprising a plurality of superposed sheets bound in the form of a book, each sheet comprising a non-porous marking surface comprising a polymeric material carried by a substrate, said marking composition consisting essentially of an aqueous dispersion of a particulate, polymeric film-forming material, a colorant, and an amount of a polymeric shear-thinning material sufficient to provide an erasable marking composition having a shear-thinning index between about 0.01 to about 0.6, said marking composition having a viscosity of about 100 cPs or lower when measured at a shear rate of 300 reciprocal seconds and providing a coalesced residue on drying which is substantially water insoluble and which can be completely erased from the marking surface with an elastomeric eraser.

2. A system of claim 1 where the substantially non-porous surfaces is provided by a polymeric material selected from the group consisting of cellulosics, polyesters, polyethylenes, polypropylenes, polystyrenes, or mixtures of these.

3. A system of claim 1 where the marking element comprises a layer of polymeric material carried by a substrate.

4. A system of claim 3 where the thickness of the layer is between about 0.1 to about 10 mils.

5. A system of claim 4 where the substrate is paper.

6. A system of claim 5 where the paper has a thickness between about 1 to about 100 mils.

7. A system of claim 6 where the layer of polymeric material is selected from the group consisting of cellulosics, polyesters, polyethylenes, polypropylenes, polystyrenes, or mixtures of these.

8. A system of claim 1 where the polymeric film forming material is selected from the group consisting of a conjugated diene-containing polymeric material, a styrene-containing polymeric material, an acrylonitrile-containing polymeric material, a carboxylated acrylonitrile-containing polymeric material and mixtures of these.

9. A system of claim 1 where the amount of film forming polymeric material in the marking composition is between about 1 to about 70 percent by weight based on the total weight of the composition.

10. A system of claim 9 where the amount of film forming polymeric material is between about 3 to about 40 percent by weight.

11. A system of claim 10 where the amount of colorant is between about 0.3 to about 15 percent by weight.

12. A system of claim 1 where the viscosity of the marking composition is between about 1 cPs to about 70 cPs when measured at 300 reciprocal seconds.

13. A system of claim 1 where the marking composition includes a polymeric shear-thinning material selected from the group consisting of xanthan gum, carageenan gum, locust bean gum, hydroxyethylcellulose, guar gum and mixtures of these.

14. A system of claim 13 where the polymeric shear-thinning material is xanthan gum in an amount between about 0.05 to about 2 percent by weight based on the total weight of the composition.

15. A system of claim 1 where the colorant is substantially water insoluble.

16. A system of claim 1 where the colorant can be rendered substantially water insoluble on drying of the marking composition.

17. A system of claim 1 where the amount of colorant is between about 0.1 to about 40 percent by weight.

18. A system of claim 1 where the erasable marking composition is retained in a ball-point pen.

19. A marking element comprising a plurality of superposed sheets bound in the form of a book, each sheet comprising a non-porous marking surface comprising a polymeric material carried by a substrate, at least one of said sheets carrying a marking on the non-porous surface, said marking being completely erasable from the non-porous surface by an elastomeric eraser and said marking being a dry, substantially water insoluble, coalesced residue of a marking composition consisting essentially of an aqueous dispersion of a particulate, polymeric film-forming material, a colorant, and a polymeric shear-thinning material, said marking composition having a viscosity of less than 100 cPs when measured at a shear rate of 300 reciprocal seconds.

20. A marking element of claim 19 where the substantially non-porous surface is provided by a polymeric material selected from the group consisting of cellulosics, polyesters, polyethylenes, polypropylenes, polystyrenes, or mixtures of these.

* * * * *